United States Patent [19]

Cao et al.

[11] Patent Number: 5,738,804
[45] Date of Patent: Apr. 14, 1998

[54] METHOD OF MAKING A LIQUID CRYSTAL COMPOSITE INCLUDING A DYE

[75] Inventors: Binh Vu Cao, San Jose; Wayne Montoya, Newark; Damoder Reddy, Irvine; Aldrich N. K. Lau, Palo Alto, all of Calif.

[73] Assignee: Raychem Corporation, Menlo Park, Calif.

[21] Appl. No.: 582,789

[22] Filed: Jan. 4, 1996

Related U.S. Application Data

[63] Continuation-in-part of Ser. No. 369,028, Jan. 5, 1995, abandoned.

[51] Int. Cl.⁶ .............................. C09K 19/52; G02F 1/13
[52] U.S. Cl. ..................... 252/299.01; 252/299.1; 252/299.5; 349/86; 349/89; 349/90; 349/92
[58] Field of Search .................. 252/299.01, 299.1, 252/299.4, 299.5; 349/86, 88, 89, 90, 92; 428/1

[56] References Cited

U.S. PATENT DOCUMENTS

| | | | |
|---|---|---|---|
| 4,435,047 | 3/1984 | Fergason | 350/334 |
| 4,596,445 | 6/1986 | Fergason | 350/339 F |
| 4,648,691 | 3/1987 | Oguchi et al. | 350/338 |
| 4,662,720 | 5/1987 | Fergason | 350/339 F |
| 4,815,826 | 3/1989 | Fergason | 350/339 F |
| 4,834,508 | 5/1989 | Fergason | 350/339 F |
| 4,838,660 | 6/1989 | Fergason | 350/339 F |
| 4,850,678 | 7/1989 | Fergason | 350/339 F |
| 4,856,876 | 8/1989 | Fergason | 350/359 F |
| 4,878,741 | 11/1989 | Fergason | 350/339 F |
| 4,953,953 | 9/1990 | Fergason | 350/339 F |
| 5,018,840 | 5/1991 | Ogawa | 350/349 |
| 5,052,784 | 10/1991 | Fergason | 359/52 |
| 5,103,326 | 4/1992 | Fergason | 359/51 |
| 5,107,352 | 4/1992 | Fergason | 359/51 |
| 5,132,815 | 7/1992 | Fergason | 359/51 |
| 5,142,389 | 8/1992 | Fergason | 359/53 |
| 5,168,380 | 12/1992 | Fergason | 359/51 |
| 5,307,185 | 4/1994 | Jones et al. | 359/41 |
| 5,405,551 | 4/1995 | Reamey et al. | 252/299.01 |
| 5,410,424 | 4/1995 | Konuma et al. | 359/51 |
| 5,427,713 | 6/1995 | Wartenberg et al. | 252/299.5 |
| 5,430,563 | 7/1995 | Bouteiller et al. | 359/51 |
| 5,543,944 | 8/1996 | Reamey et al. | 359/51 |
| 5,571,448 | 11/1996 | Wartenberg et al. | 252/299.5 |
| 5,585,947 | 12/1996 | Havens et al. | 349/92 |

FOREIGN PATENT DOCUMENTS

| | | | |
|---|---|---|---|
| 0 608 969 A1 | 8/1994 | European Pat. Off. | C09K 19/54 |
| 63-287830 | 11/1988 | Japan | G02F 1/137 |
| WO 95/25777 | 9/1995 | WIPO | C09K 19/54 |

OTHER PUBLICATIONS

Derwent abstract no. 91–187156/26 (abstract of EP 434366 (Matsushita Elec. Ind.) (1991) ).

*Primary Examiner*—Shean C. Wu
*Attorney, Agent, or Firm*—Herbert G. Burkard; Yuan Chao

[57] ABSTRACT

A method is disclosed for making a liquid crystal composite including a dye. The method comprises forming volumes in which a liquid crystal material is surrounded by a containment medium, forming a dye dispersion, combining the dye dispersion and the volumes of liquid material, and treating that combination to facilitate the transfer of the dye into the volumes of liquid crystal material.

23 Claims, 3 Drawing Sheets

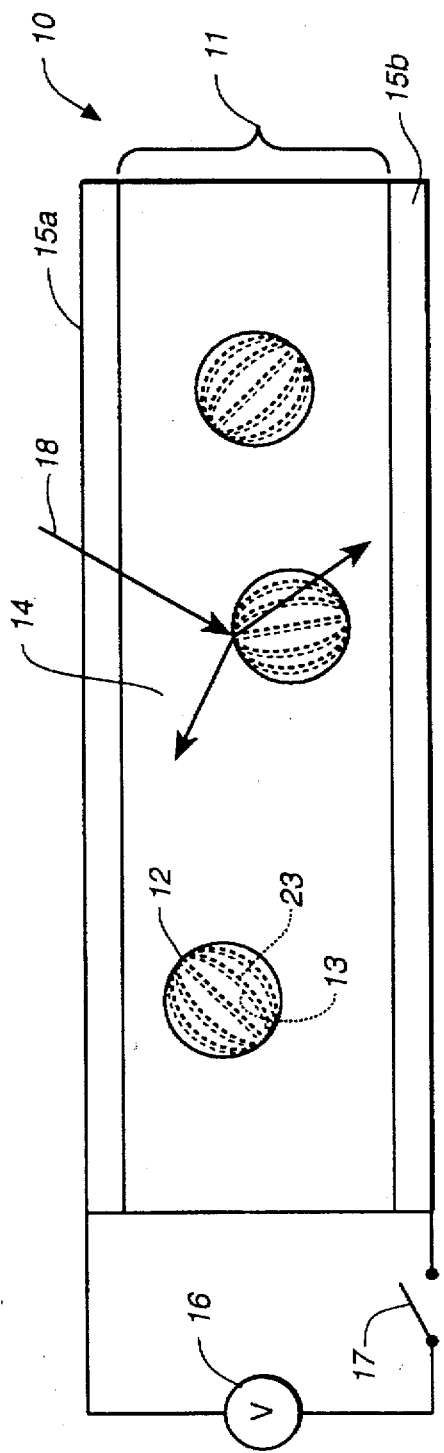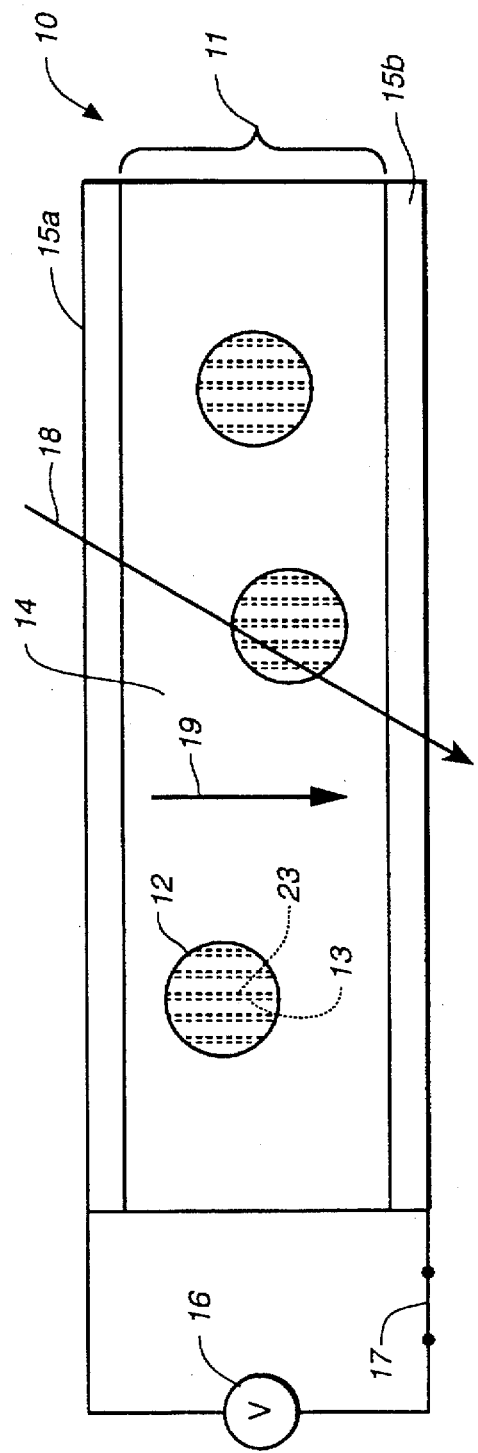

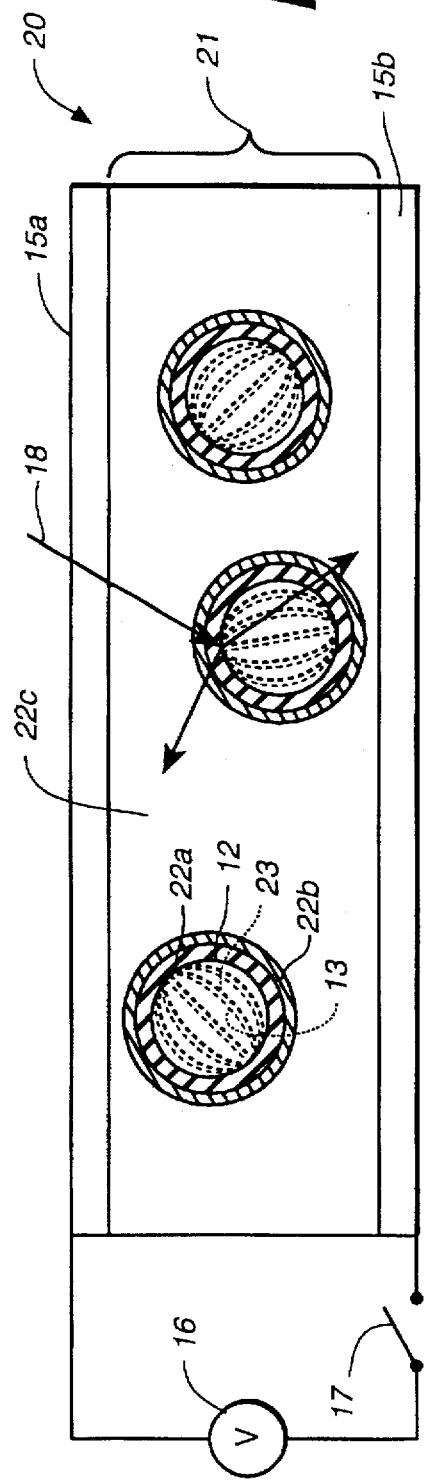
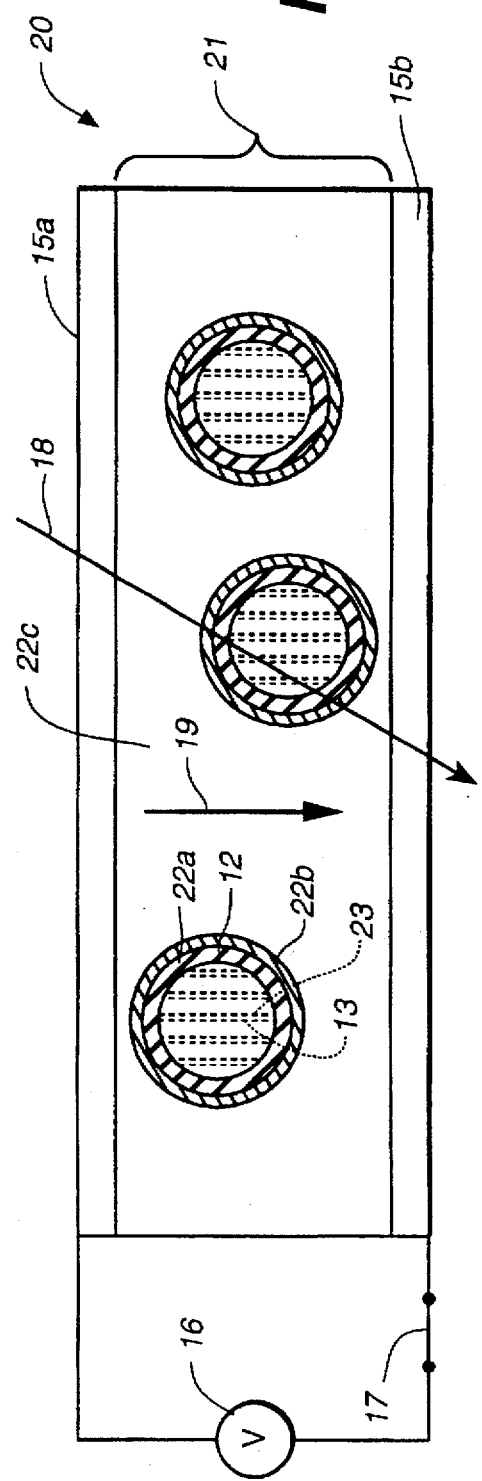

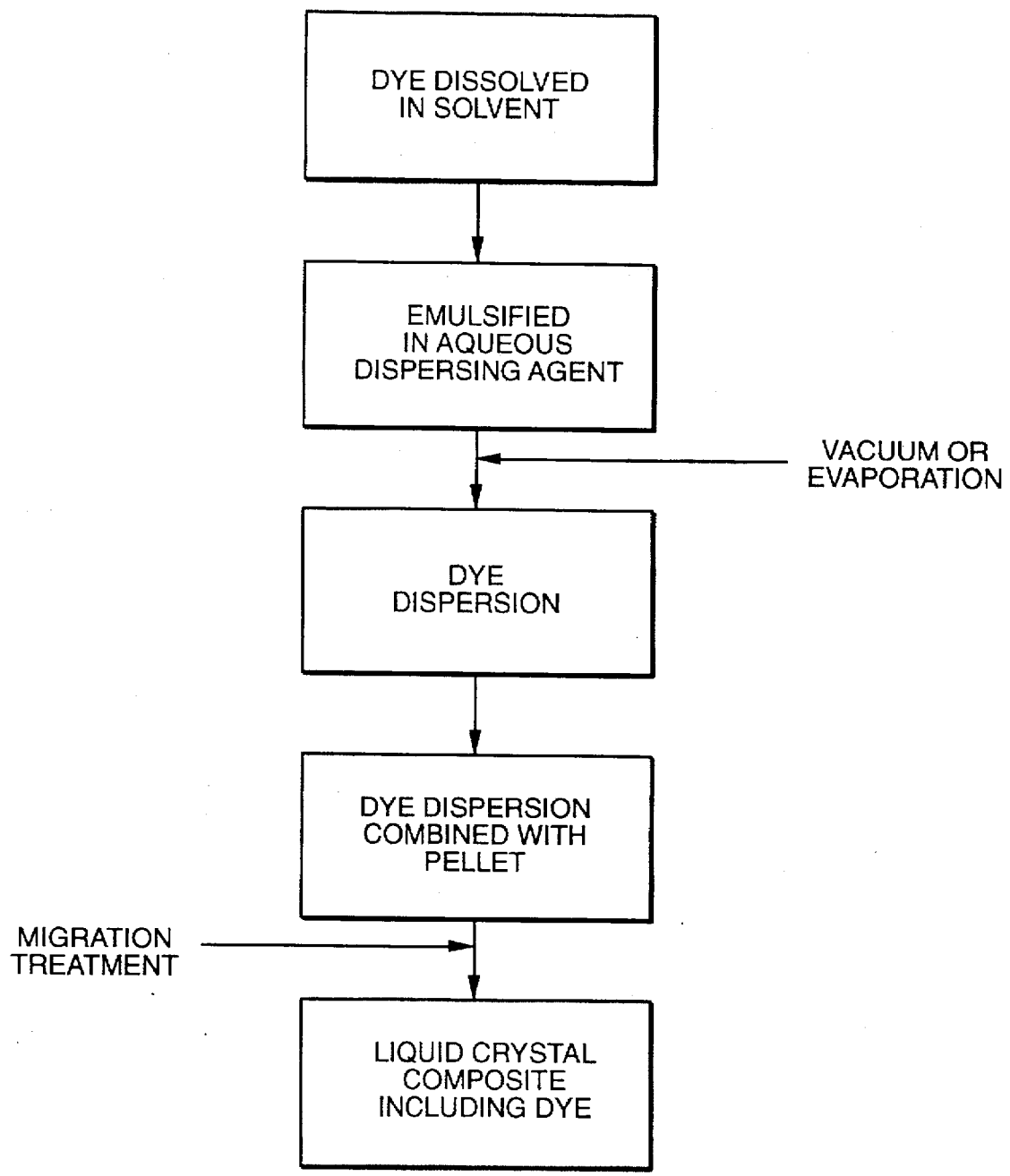
FIG._3

1

METHOD OF MAKING A LIQUID CRYSTAL COMPOSITE INCLUDING A DYE

CROSS-REFERENCE TO RELATED APPLICATIONS

This application is a continuation-in-part of application Ser. No. 08/369,028, filed Jan. 5, 1995, now abandoned, the disclosure of which is incorporated herein by reference.

TECHNICAL FIELD OF THE INVENTION

This invention relates especially to liquid crystal composites suitable for use in light valves and methods of making such composites including dyes.

BACKGROUND OF THE INVENTION

Liquid crystal light valves in which the electro-optically active element is a liquid crystal composite are known. The composite comprises plural volumes or droplets of a liquid crystal material dispersed, encapsulated, embedded, or otherwise contained within a polymer matrix. Exemplary disclosures include Fergason, U.S. Pat. No. 4,435,047 (1984) ("Fergason '047"); West et al., U.S. Pat. No. 4,685,771 (1987); Pearlman, U.S. Pat. No. 4,992,201 (1991); and Dainippon Ink, EP 0,313,053 (1989). These light valves may be used in displays and window or privacy panels.

Also known is the concept of disposing a further material between the polymer matrix and the liquid crystal material. See, e.g., Fergason, '047; Fergason et al., U.S. Pat. No. 4,950,052 (1990) ("Fergason '052"); and Raythem, WO 93/18431 (1993) ("Raychem '431"). The function of this further material has been variously stated as preserving the integrity of the volumes of liquid crystal material and for altering the electro-optical properties of the composite.

Improved processes for making composites, including an intervening further material or materials, are disclosed in Rearhey et al., U.S. Pat. No. 5,405,551 (1994), and Havens et al., WO 95/25777 (1995); the disclosures of which are incorporated herein by reference.

It is desirable for certain applications to include a dye within the volumes or droplets of liquid crystal material of composites including such intervening further material. This, however, is sometimes difficult to accomplish due to the inhibition of polymerization of the intervening further material caused by the presence of the dye. The present invention provides a repeatable and effective process for making such composites including dyes.

SUMMARY OF THE INVENTION

There is provided a method for making a liquid crystal composite including plural volumes of a liquid crystal material and a dye dispersed in a containment medium. The method comprises the steps of forming volumes in which the liquid crystal material is bounded by the containment medium, forming a dye dispersion, forming an emulsion comprising the dye dispersion and the volumes of liquid crystal material, and causing the dye to transfer from the dye dispersion into the volumes of liquid crystal material. Components other than dyes may also be introduced into the liquid crystal material in this manner. Such components may include interface modifiers, twist agents, and additives for lowering the operating field. The liquid crystal composites of the present invention provide low voltage, high voltage-holding displays with good optical performance, as shown in the examples below.

BRIEF DESCRIPTION OF THE DRAWING(S)

FIGS. 1a–1b show a light valve made from a liquid crystal composite. FIGS. 2a–2b show a preferred light valve made from a liquid crystal composite made according to the invention. FIG. 3 is a flow chart illustrating steps of the present invention.

DESCRIPTION OF THE PREFERRED EMBODIMENTS

FIGS. 1a and 1b show a light valve made from a liquid crystal composite, such as described in Fergason '047. Light valve 10 comprises a liquid crystal composite 11 in which droplets or volumes 12 of nematic liquid crystal material 13 having a positive dielectric anisotropy are dispersed in an encapsulating material 14. A pleochroic or isotropic dye 23 may be mixed with liquid crystal material 13 in droplets 12.

Composite 11 is sandwiched between first and second electrodes 15a and 15b, made from a transparent conductor such as indium tin oxide ("ITO"). The application or not of a voltage across electrodes 15a and 15b from power source 16 is controlled by switch 17, shown in FIG. 1a in the open position ("off-state"). As a result, no voltage is impressed across composite 11, and the electric field experienced by liquid crystal material 13 and dye 23 is effectively zero. Due to surface interactions, the liquid crystal molecules preferentially lie with their long axes parallel to the curved interface with encapsulating material 14, resulting in a generally curvilinear alignment within each droplet. The alignment of dye 23 follows the alignment of the liquid crystal molecules. In this particular embodiment, encapsulating material 14 also acts as a matrix to contain the droplets 12 of liquid crystal material 13 and dye 23. The curvilinear axes in different droplets 12 are randomly oriented, as symbolized by the differing orientations of the curvilinear patterns.

Liquid crystal material 13 may have an extraordinary index of refraction $n_e$ which is different from the index of refraction $n_p$ of encapsulating material 14 and an ordinary index of refraction $n_o$ which is the substantially the same as $n_p$. (Herein, two indices of refraction are said to be substantially the same, or matched, if they differ by less than 0.05, preferably less than 0.02.) Incident light ray 18 traveling through composite 11 has a high statistical probability of encountering at least one interface between encapsulating material 14 and liquid crystal material 13 in which the liquid crystal index of refraction with which it operatively interacts is $n_e$. Since $n_e$ is different from $n_p$, there is refraction or scattering of light ray 18, both forwardly and backwardly. Additionally, in this off-state, the dye 23 provides a substantial amount of light absorption, causing, depending on the dye, composite 11 to produce a colored visual effect. See Fergason, U.S. Pat. No. 5,206,747 (1993) as an example of such a liquid crystal composite.

FIG. 1b shows light valve 10 in the on-state, with switch 17 closed. An electric field, directionally indicated by arrow 19, is applied between electrodes 15a and 15b, and across composite 11. Liquid crystal material 13, being positively dielectrically anisotropic, aligns parallel to the electric field direction. The dye 23, which follows the orientation of the liquid crystal molecules, also aligns parallel to the electric field direction. (The required voltage is dependent inter alia on the thickness of the composite and typically is between 3 and 50 V.) Further, this alignment with the field occurs in each droplet 12, so that there is order among the directors from droplet to droplet, as shown symbolically in FIG. 1b. When the liquid crystal and dye molecules are aligned in this manner, the liquid crystal index of refraction with which incident light ray 18 operatively interacts is $n_o$. Because $n_o$ is substantially the same as $n_p$, there is no scattering at the liquid crystal-encapsulating material interface and light absorption due to dye is at a minimum. As a result, ray 18 is transmitted through composite 11, which now appears transparent. Transmission rates of at least 50%, and preferably on the order of 60% to 70% or higher may be attained.

In another configuration of composite 11, the birefringence of the liquid crystal material may be relatively low, and the ordinary and extraordinary indices of a fraction of the liquid crystal are matched closely, if not identically, to that of the encapsulating material 14. Thus, refraction and scattering at the interfaces between the liquid crystal material and the encapsulating medium are minimized. However, the pleochroic dye in the liquid crystal material provides controlled attenuation of light by absorption as a function of whether an electric field is applied to the droplets 12 and of the magnitude of the field. The dye absorbs light in both the off-state and the on-state. The degree of light absorption, however, is significantly less in the on-state. This configuration is described in U.S. Pat. No. 4,556,289 (1985).

The electro-optical performance (e.g., switching voltage, off-state scattering, switching speed, and hysteresis) of light valve 10 is dependent on the nature of the surface interactions between encapsulating material 14 and liquid crystal material 13. An encapsulating material which is desirable in respect of characteristics such as mechanical properties, ability to protect against environmental contaminants, UV stability, etc. may be undesirable in respect of its surface interactions with the liquid crystal material, for example causing the switching speed to be too slow or the switching voltage to be too high. Thus, it is desirable to be able to divorce the surface interactions from the other characteristics of the encapsulating material.

FIGS. 2a–2b (where numerals repeated from FIGS. 1a–1b denote like elements) show a light valve 20 of the present invention in which this objective is achieved. Light valve 20 comprises a liquid crystal composite 21. The liquid crystal composite includes liquid crystal material 13 and dye 23 which is first surrounded by an interfacial material 22a and then by an encapsulating material 22b, and finally by a matrix material 22c. The encapsulating material serves an encapsulating function only and the matrix function is served by the matrix material. Light valve 20 may have a colored appearance in the off-state (FIG. 2a) and be transparent in the on-state (FIG. 2b), for the reasons given above. Liquid crystal material 13 and dye 23 in droplets 12 are separated from encapsulating material 22b by interfacial material 22a. Thus, the surface interactions affecting the alignment of liquid crystal material 13 and dye 23 are predominantly with interfacial material 22a and not with encapsulating material 22b. Interfacial material 22a may be selected on the basis of its interactions with the liquid crystal material and dye. The encapsulating material 22b may be selected on the basis of its mechanical, optical, or other properties. For example, the encapsulating material has to stabilize the emulsion of liquid crystal material in a carrier medium when an emulsion process is used. In this way, the necessity to compromise in respect of one set or another of properties is avoided.

Matching of $n_o$ of the liquid crystal material with the index of refraction $n_p$ of the interfacial material is important only if the thickness of the layer of interfacial material is comparable to the wavelength of light. Generally the thickness is less than approximately 100 nanometers (nm), much less than the wavelengths of 400 to 700 nm for visible light, so that the matching of the indices of refraction is normally not necessary. However, where the layer of interfacial material is thick or where minimizing of on-state haze is an objective (e.g., in window applications), matching of the indices of refraction is desirable.

In order to obtain the advantages of the present invention, it is not necessary that interfacial material 22a completely separates encapsulating material 22b from liquid crystal material 13 and dye 23. It is sufficient that interfacial material 22a at least partially separates the latter two materials, so that the switching characteristics (speed, voltage, hysteresis, etc.) of light valve 20 are characteristic of an interfacial material-liquid crystal material interface and not of an encapsulating material-liquid crystal material interface. Preferably, interfacial material 22a effectively separates encapsulating material 22b and liquid crystal material 13, by which is meant that the interfaces of liquid crystal material 13 are primarily with interfacial material 22a and not with encapsulating material 22b.

In the foregoing figures, the droplets, capsules or volumes 12 of liquid crystal material 13 and dye 23 have been shown as having a spherical shape as a matter of convenience. Other shapes are possible, for example oblate spheroids, irregular shapes, or dumbbell-like shapes in which two or more droplets are connected by channels. Also, the thickness of the layer of interfacial material 22a and the size of droplets 12 have been greatly exaggerated for clarity.

In accordance with the present invention, one may emulsify the liquid crystal material, the encapsulating material, and the interfacial material (or a precursor thereof) in a carrier media to form an intermediate in which the liquid crystal material and interfacial material (or precursor thereof) are contained within the encapsulating material; cool to separate the interfacial material (or precursor) and deposit it between the encapsulating material and the liquid crystal material; where an interfacial material precursor was used, cure the precursor (e.g., photochemically); separate the carrier media for example by centrifugation, to form capsules in which the liquid crystal material is successively surrounded by an interfacial material and encapsulating material. A solution of poly(vinyl alcohol) may be added prior to centrifugation for viscosity control and as an emulsion stabilizing agent. The use of a centrifuge may, in some instances, be unnecessary. However, centrifuging generally results in lower operating voltages, as the breadth of the droplet size distribution is decreased. An emulsion may be prepared by rapidly agitating a mixture of liquid crystal material, interfacial material (or precursor thereof), encapsulating material, and a carrier media, typically water. Optionally, an emulsifier, wetting agent, or other surface active agent may be added. Suitable emulsification techniques are disclosed in Fergason '047, Fergason '052, Raythem '431, and Andrews et al., U.S. Pat. No. 5,202,063 (1993), the disclosures of which are incorporated herein by reference.

Further, in accordance with the present invention, as shown in FIG. 3, a pleochroic or isotropic dye, or some other component as discussed below, may first be dissolved in a volatile solvent. Small amounts of a non-volatile solvent may be included in the solution of the volatile solvent and dye. Alternatively, a liquid crystal material may be included in this solution. (See Examples III and IV below.) The non-volatile solvent may be present in the solution on the order of between about 0.5% and 10%. The liquid crystal material may also be present in the solution on the order of between about 0.5% and 10%. The liquid crystal material acts as a diluent. When the liquid crystal is included in the dispersion, the emulsion seems to filter better, giving less agglomeration of dye. The liquid crystal material also seems to help stabilize the dispersion. This results in a better coating quality. The function of the non-volatile solvent is basically the same as the liquid crystal. Other dispersion stabilizers also may be added to the dye/solvent combination to stabilize the dispersion, such as acrylate polymers (both high and low molecular weight), surfactants, poly(vinyl ether), poly(vinyl butyral), poly(d,l-lactic acid), and the like.

The solution of the solvent and dye is next emulsified in an aqueous dispersing agent. The dispersing agent may be a macromolecular binder material in an aqueous carrier medium which is preferably soluble or colloidally dispersible in the carrier medium. The binder material may be a polymer binder solution of poly(vinyl alcohol) or a dispersion of polyurethane, in the carrier medium (see examples I–IV and VI). The dispersing agent may also be a combination or blend of such materials (see Examples II–IV below). The binder material, alone or in combination with some other matrix-forming material, may ultimately form the matrix of liquid crystal composite 21. Alternatively, the dispersing agent may be an aqueous solution of a low molecular weight dispersant. A surfactant or polymer that acts as a dispersant for the dye may be used, such as Aerosol™ OT (American Cyanamid). (See Example V.) The volatile solvent is removed from the emulsion by heating or by vacuum, to obtain a dispersion of the dye in the dispersing agent, which may be called the dye dispersion. One or more surfactants may be included in the emulsion of the dye and the dispersing agent to stabilize the dye dispersion.

A liquid crystal structure, including a liquid crystal material successively surrounded by the interfacial material and encapsulating material, may then be combined or worked-up into the dye dispersion. This liquid crystal structure, for the sake of convenience, may be referred to as a pellet that comprises the liquid crystal material, the interfacial material and the encapsulating material, arranged as noted above. A matrix-forming material may be added to the combination of the dye dispersion and pellet (see Examples I and V–VI).

The resulting emulsion can then be coated onto electrode-coated substrate 15b and allowed to dry, cure, solidify, etc., to form a liquid crystal composite film. A second electrode-coated substrate 15b that functions as a counterelectrode can be laminated onto the liquid crystal film to form, for example, an optical display device. This device may then be thermally treated to facilitate migration of the dye from the matrix material, for example, into the liquid crystal material. For example, the device may be thermally annealed at 40°–140° C. for 0.5–100 hours. Sonic or acoustic sound waves, or other forms of energy may also be used to facilitate transfer of the dye into the volumes of liquid crystal material. The device may also be autoclaved, the application of pressure and heat, at pressures from between about 20 to 200 pounds per square inch (psi) and temperatures from between about 30° to 140° C., to facilitate migration of dye into the liquid crystal, volumes, droplets or capsules.

The present invention also contemplates dispersing a dye powder, or some other component, in an aqueous dispersing agent (see, e.g., Example VI). The dye powder may be dispersed in the dispersing agent by physical means such as by use of a ball-mill, sandmill, hammermill, disk grinder, or by sonication. The dye powder may be processed to yield dye particle sizes of between about 0.1 and 3 μm in diameter. Dispersing agents of the types mentioned above may be used during such processing, as could surfactants, liquid crystals, and volatile or non-volatile solvents, for the same reasons as mentioned previously. The physical grinding process is another way to make the dispersion. The techniques to improve the dispersion stability or quality still apply.

The particle size of the dye in the dye dispersion may be controlled by varying the mixing conditions of the dye in the volatile solvent or by controlling the concentration of the dye in the solvent. The dye particle size distribution may be controlled by varying the viscosity of the dispersing agent or by centrifugation. The dye particle size and distribution may be controlled by varying the mixing temperature of the dye in the volatile solvent.

The ratio of matrix-forming material to liquid crystal material may vary between about 40% and 95% liquid crystal material. The binder material or dispersing agent of the dye dispersion and the encapsulating material of the pellet may be the same or different materials. For example, a liquid crystal material may be emulsified in poly(vinyl alcohol) and pelletized, and then worked-up in a dye dispersion including a poly(vinyl alcohol) binder solution. On the other hand, a liquid crystal material may be emulsified in poly(vinyl alcohol), pelletized, and then worked-up in a dye dispersion comprising an equal blend of poly(vinyl alcohol) and latex.

Also, in accordance with the present invention, a pellet may be worked-up in a dye dispersion to obtain a pellet incorporating the dye. This dyed pellet may then be combined with another binder material different from that used to form the dispersion. For example, a pellet may be worked-up in a dye dispersion made of poly(vinyl alcohol), and pelletized to obtain a dyed pellet. This dyed pellet may then be dispersed in a latex.

The method of the present invention may also be used to introduce components other than a dye into the liquid crystal material. Examples of such other components include twist agents, interface modifiers and additives for lowering the operating field. The implementation is analogous to the introduction of dye as described above. In some cases, the additive, interface modifier, or twist agent, for example, will interfere with emulsion formation, interface agent curing or coating. In these cases, the process of the present invention can be used to introduce these components subsequent to such processes. Additives for lowering the operating field may be those described in Raychem '431, the disclosure of which is incorporated by reference. Interface modifiers or agents can be anionic, cationic or non-ionic surfactants and block copolymers. Twist agents are chiral materials which lead to a twisting of the liquid crystal directors within the droplet, an example of which is CB-15 (E. Merck).

It should be understood that the encapsulating material and the matrix material need not be the same material. Also the method of the present invention may be used to introduce a dye into liquid crystal volumes in a film or liquid crystal structure wherein the encapsulating material acts as a matrix to contain the droplets of liquid crystal material and dye, and an interfacial material separates the liquid crystal material and the encapsulating material. Such a film is disclosed in above-mentioned WO 95/25777.

The method of the present invention may also be used to introduce a dye into liquid crystal volumes in a film made by an emulsion process but not including the interfacial material. That is, this method may be used to introduce a dye into liquid crystal film like that disclosed in above-mentioned U.S. Pat. No. 5,405,551, which includes matrix and encapsulating materials but not an interfacial material. The present invention may also be used to introduce a dye into liquid crystal volumes in a film including only an encapsulating material. Such a film is disclosed in Fergason '047 and also shown in FIGS. 1a and b.

Additionally, in accordance with the present invention, a dye may be introduced into liquid crystal droplets in a film including only a matrix material. Such a film may be made by a phase separation process, as described in West et al., U.S. Pat. No. 4,685,771 (1987), which is hereby incorporated by reference.

Thus, the method of the present invention may be used to introduce a pleochroic dye into volumes of liquid crystal material in a containment medium. The containment medium may comprise an encapsulating material, a matrix material, a combination of encapsulating and matrix materials, a combination of interfacial and encapsulating materials, or a combination of interfacial, encapsulating and matrix materials, all as described above. The containment medium, in whatever form it may take, induces a distorted alignment of the liquid crystal material and dye in the absence of a prescribed input such as an electrical field. An ordered alignment is produced when an electrical field is applied across the liquid crystal material and dye in the containment medium. Light may then be transmitted through the liquid crystal composite.

Suitable encapsulating materials include poly(vinyl alcohol), poly(vinyl pyrrolidone), poly(ethylene glycol), poly(acrylic acid) and its copolymers, poly(hydroxy acrylate), cellulose derivatives, epoxies, silicones, acrylates, polyesters, styrene-acrylic acid-acrylate terpolymers, and mixtures thereof. A combination of an aqueous carrier medium and an encapsulating material which is soluble or colloidally dispersible in the aqueous carrier medium is particularly preferred. Although surface active agents may be employed, it is generally preferred that the encapsulating material be capable of forming capsules containing the liquid crystal material without their addition. In such cases, the encapsulating material itself should have good surface active properties (i.e., be a good emulsifier). A class of polymers having such characteristics are amphiphilic polymers containing both hydrophilic and lipophilic segments. Examples of this class include partially hydrolyzed poly (vinyl acetates) (e.g., Airvol™ 205 from Air Products), ethylene-acrylic copolymers (e.g., Adcote™, from Dow Chemical), and styrene-acrylic acid acrylate terpolymers (e.g., Joncryl™ from S. C. Johnson). It can be advantageous to crosslink, physically entangle molecular chains, or otherwise ensure that the encapsulating material is fixed in place, so that displacement by the matrix material is minimized.

As noted above, one may initially form the emulsion that forms the pellet not in the presence of the interfacial material, but a precursor thereof, which may eventually be polymerized to form the interfacial material. Phase separation between the liquid crystal material and the interfacial material precursor may be effected by solvent removal or temperature change as described above. Thereafter, the interfacial material precursor is converted to the interfacial material by polymerization. Polymerization of the interfacial material precursor may be initiated by heating (where phase separation is effected by solvent removal) or, preferably, photochemically, for example by irradiation with UV light. Since the interfacial material's solubility characteristics will be different from those of the interfacial material precursor, it may not be necessary, where temperature change methods are used, to do the emulsification at a temperature above the ordinary service temperature of the final composite. As used herein, "polymerizing" and "polymerization" may include the reaction of the interfacial material (or its precursor) with the encapsulating material to fix the interfacial material between the liquid crystal material and the encapsulating material.

Suitable interfacial material precursors include mono or difunctional acrylates, mono or difunctional methacrylates, epoxies (for example, those cured with thiols, amines or alcohols), isocyanates (for example, those cured with alcohols or amines), and silanes. Precursors with branched alkyl units, for example 2-ethyl hexyl acrylate, are preferred. Suitable interfacial materials are the corresponding polymers and oligomers derived from the above-listed precursors, namely acrylates, methacrylates, epoxies, polyurethanes, polyureas, siloxanes, vinyl polymers, and mixtures thereof.

Suitable matrix/binder materials include polyurethane, poly(vinyl alcohol), epoxies, poly(vinyl pyrrolidone), poly (ethylene glycol), poly(acrylic acid) and its copolymers, poly(hydroxy acrylate), cellulose derivatives, silicones, acrylates, polyesters, styrene-acrylic acid-acrylate terpolymers, and mixtures thereof.

Various dichroic or pleochroic dyes may be used in the method of the present invention. Exemplary dye materials are black dichroic mixtures such as MGG1. MGG1 is a dye mixture including 27% SI486, 27% M618 (both available from Mitsui Toatsu Chemicals) and 46% GX874 (available from Nippon Kankoh Shikiso Kenkyusho). Azo, anthraquinone and perylene dyes may be used.

A preferred combination of interfacial material, encapsulating material and matrix/binder material is poly(2-ethylhexyl acrylate), poly(vinyl alcohol) (PVA), and polyurethane and PVA, respectively. (See Example I.) It is probably necessary to minimize PVA content in the binder/matrix for plastic device applications (due to humidity/moisture resistance). For glass packaged systems, the PVA content is not an issue. A black dichroic blend dye is preferred. Many applications want an "on-off" shutter requiring a black off-state. A black dye blend may be obtained by mixing of at least three dyes, such as in MGG1, described above. Such composites were found to have an especially low operating fields, superior field-off scattering and absorption, wide operational temperature ranges, and good voltage-holding performances.

The above discussions have been in the context of nematic liquid crystals having a positive dielectric anisotropy, but other types of liquid crystals may be encapsulated by the method of this invention. One may apply the techniques of this invention to liquid crystal composites in which the liquid crystal material is a chiral nematic (also known as cholesteric) one, such as disclosed in Crooker et al., U.S. Pat. No. 5,200,845 (1993); and Jones, U.S. Pat. No. 5,463,482 (1995). Also, composites in which the liquid crystal material is a smectic, as disclosed in Pearlman et al., U.S. Pat. No. 5,216,530 (1993), are contemplated.

The practice of this invention may be further understood by reference to the following examples, which are provided by way of illustration and not of limitation. All relative amounts are by weight unless indicated otherwise. The most preferred embodiment is set forth in Example I. The electro-optical performance of liquid crystal devices made in accordance with the present invention are provided in the tables associated with the examples. The following general procedures were used in making these measurements.

Optical measurements were obtained with f/0 collection optics and a collimated 5504±40 nanometer (nm) light source. For each test, $T_{on}$ is the maximum transmission in the presence of a voltage, $T_{off}$ is the percent transmission in the absence of an applied voltage, and $E_{90}$ is the field (in volts per micron (V/µm)) required to turn device on to 90% of the difference between $T_{on}$ and $T_{off}$. In order to measure $T_{on}$ and $E_{90}$, samples were stepped up and down in voltage (25 steps up/25 steps down, 0.7 seconds per step) to a relatively high field (typically 3–6 V/μm). The value $T_{90}$ is given by the equation:

$$T_{90} = 0.9(T_{on} - T_{off}) + T_{off}$$

The applied field needed to reach $T_{90}$ on the up curve is $E_{90}$ (the up curve being the % T/V curve obtained with increasing voltage). The operating field $E_{90}$ is substantially independent of sample thickness. The corresponding operating voltage $V_{90}$ is thickness-dependent and has units of volts. $V_{90}$ is obtained by multiplying $E_{90}$ by the thickness (t) in microns of the liquid crystal structure ($V_{90} = t \cdot E_{90}$).

The switching speed of a device is a measure of the time for a film of an encapsulated liquid crystal material to mm on or off with the application or removal of a voltage. One way to measure switching speed is to monitor the optical response of the film while applying and then removing the voltage. Switching speeds were obtained by giving a sample a 1-second, 33.3 Hz square wave signal at $E_{90}$. The time it takes a device to go from 10% to 90% of its final response when the voltage is applied may be referred to as the "rise time", while the time for the device to drop from 90% to 10% of its response upon removal of the voltage may be referred to as the "fall time". The measured switching speeds depend on the voltage applied. For displays that show moving graphics, it is desirable to have rise and fall times of less than about 50 milliseconds (resets.). If the switching speeds are much slower, blurring of the moving image results. For "frame-sequential" displays, faster rise and fall times, e.g. less than about 15 msec, are desired to obtain good color purity.

The voltage holding ratio (VHR) is defined as the percentage of the originally applied voltage that remains at the end of a 15 msec hold time. VHR was measured by applying a series of alternating polarity voltage pulses to the devices. The pulses were 30–300 msec in duration and were applied every 15 msec. During the 15 msec hold time, the device was held in open circuit and the decay of the applied voltage across the device was monitored. The VHR measurement was taken at "steady state", which for most devices tested was obtained after 20 pulses. Larger values of VHR are more desirable. The VHR measurement was normally performed at or above $E_{90}$. Displays of the present invention preferably have a VHR that is at least 50 percent, more preferably at least 80 percent, and most preferably at least 90 percent.

A device may show hysteresis in its optical response. The optical response of a device at a given voltage depends on whether the device reached the given voltage from a previously higher or lower voltage. Many displays are designed such that a given electrical signal (voltage) should correspond to a desired optical response. Hysteresis degrades the ability of the device to accurately reach that desired optical response. This would have the effect of lowering the number of gray levels in a high resolution display. One way to measure hysteresis is to ramp the voltage applied to the device up and then down to compare optical response curves. The greater the difference between the up and down curves, the greater the hysteresis. The hysteresis value for a device would depend strongly on the time and voltages used in the test. In most applications, it is desired to have the hysteresis as low as possible: less than twenty percent difference, with less than six percent preferred.

EXAMPLE I

The MGG1 dye was dissolved in the volatile solvent $CH_2Cl_2$ to obtain a 2.46% solution. A mixture containing 10 g of 10% w/w aqueous solution poly(vinyl alcohol) (Vinol™ 205 from Air Products) and 19.69 g of 2.46% MGG1 dye in $CH_2Cl_2$ was emulsified at 6238 revolutions per minute (rpm) for twenty min. The resulting dye dispersion was heated on a hot plate at 40° C. for two hours to evaporate the solvent $CH_2Cl_2$. This was then diluted with deionized water to form a 5% poly(vinyl alcohol) dye dispersion solution.

An emulsion was prepared by mixing a solution of 100 parts of a 50—50 blend of the liquid crystal TL205 and the liquid crystal TL216 (both from EM Industries) with 20 parts of the acrylate mixture PN393 (EM Industries) in a 10% aqueous solution of Vinol™ 205 PVA. This emulsion was cured by exposure to about 12 mW/cm² UV radiation at about 0° C. under $N_2$. The emulsion was filtered and pelletized in a high speed centrifuge. The supernatent was decanted off, leaving a pellet of centrifuged emulsion at the base of the centrifuge tube. This pellet was worked-up with the dye dispersion described above by adding 0.81 g of the pellet to 0.669 g of the dye dispersion and 0.574 g of 5% Neorez™ 967 polyurethane (from ICI Resins); this was mixed thoroughly. The emulsion was coated onto an ITO-coated polyester substrate. The coating was allowed to dry in air for an hour before laminating with an ITO-coated polyester counter plate at 55° C. Such cells were heated at 100° C. for 88 hours. The electro-optic properties of the cells are given in Table 1.

TABLE 1

| Thickness (μm) | $T_{off}$ (%) | $T_{on}$ (%) | VHR (%) | $E_{90}$ (V/μm) | Hysteresis (%) | Rise Time (msec) | Fall Time (msec) |
|---|---|---|---|---|---|---|---|
| 8.48 | 10.8 | 54.5 | 93 | 0.87 | 34 | 52 | 85 |
| 8.41 | 11.7 | 55.3 | 93 | 0.85 | 9 | 58 | 86 |

EXAMPLE II

The MGG1 dye was dissolved in the $CH_2Cl_2$ to obtain a 4% solution. A mixture containing 7.5 g of 5% w/w aqueous solution of Vinol™ 205 poly(vinyl alcohol), 7.5 g of 5% Neorez™ 967 polyurethane (from ICI Resins) and 4.4 g of 4% MGG1 dye in $CH_2Cl_2$ were mixed together, and emulsified at 6400 rpm for 15 min. The resulting dye dispersion was heated on hot plate at 40° C. for 2 hours to evaporate the $CH_2Cl_2$.

A pellet of liquid crystal TL205 and the acrylate mixture PN393 (20 parts) was prepared using a procedure analogous to that described in Example I above. The pellet was worked-up with the dye dispersion described above by adding 2.011 g of pellet to 2.23 g of dye dispersion and mixing it thoroughly. The emulsion was coated on an ITO-coated polyester substrate. The coating was allowed to dry in air for an hour before laminating with an ITO-coated polyester counter plate at 55° C. Such cells were heated at 100° C. for 88 hours. The electro-optic properties of the cells are given in Table 2.

TABLE 2

| Thickness (μm) | $T_{off}$ (%) | $T_{on}$ (%) | VHR (%) | $E_{90}$ (V/μm) | Hysteresis (%) | Rise Time (msec) | Fall Time (msec) |
|---|---|---|---|---|---|---|---|
| 9.47 | 17.3 | 63.5 | 95 | 0.72 | 21 | 78 | 191 |
| 8.36 | 22.1 | 66.0 | 95 | 0.73 | 17 | 75 | 188 |

EXAMPLE III

MGG1 dye was dissolved in $CH_2Cl_2$ to obtain a 3.63% solution. A mixture containing 3 g of 10% w/w aqueous solution of Vinol™ 205 poly(vinyl alcohol), 3 g of 10% Neorez™ 967 polyurethane, 0.18 g of the liquid crystal TL205, and 4.43 g of 4% MGGl dye in $CH_2Cl_2$ were mixed together, and emulsified at 6400 rpm for 10 min. The resulting dye dispersion was heated on a hot plate at 40° C. for 2 hours to evaporate the $CH_2Cl_2$.

A pellet of liquid crystal TL205 (100 parts) and the acrylate mixture PN393 (20 parts) was prepared using a procedure analogous to that described in Example I above. The pellet was worked-up by adding the dye dispersion described above to 1.5 g of pellet and mixing it thoroughly. The emulsion was coated onto an ITO-coated polyester substrate. The coating was allowed to dry in air for an hour before laminating with an ITO-coated polyester counter plate at 55° C. Such cells were heated at 100° C. for 58 hr. The electro-optic properties of these cells are given below in Table 3.

TABLE 3

| Thickness (μm) | $T_{off}$ (%) | $T_{on}$ (%) | VHR (%) | $E_{90}$ (V/μm) | Hysteresis (%) | Rise Time (msec) | Fall Time (msec) |
|---|---|---|---|---|---|---|---|
| 8.71 | 12.7 | 55.6 | 91 | 0.68 | 37 | 78 | 422 |
| 7.34 | 15.2 | 59.9 | 95 | 0.73 | 39 | 70 | 413 |

Devices were also prepared by slot-die coating the emulsion onto an ITO-coated glass substrate. The coating was allowed to dry for 1 hr before laminating with an ITO-coated glass substrate counter plate. The glass unit cells were autoclaved at 50° C. and 110 psi for 30 min before annealing at 100° C. for 62 hr. Their electro-optic properties are given in Table 4.

TABLE 4

| Thickness (μm) | $T_{off}$ (%) | $T_{on}$ (%) | VHR (%) | $E_{90}$ (V/μm) | Hysteresis (%) | Rise Time (msec) | Fall Time (msec) |
|---|---|---|---|---|---|---|---|
| 7.2 | 16.4 | 65.5 | 96 | 0.72 | 34 | 93 | 283 |
| 8.1 | 13.4 | 63.1 | 96 | 0.69 | 35 | 92 | 297 |
| 8.0 | 12.6 | 61.4 | 95 | 0.71 | 36 | 99 | 283 |
| 9.0 | 10.2 | 59.1 | 97 | 0.69 | 39 | 103 | 281 |

EXAMPLE IV

MGGl dye was dissolved in $CH_2Cl_2$ to obtain a 3.63% solution. A mixture containing 3 g of 10% w/w aqueous solution of Vinol™ 205 poly(vinyl alcohol), 3 g of 10% Neorez™ 967 polyurethane, 0.18 g of the liquid crystal TL216, and 4.43 g of 3.63% MGGl dye in $CH_2Cl_2$ were mixed together and emulsified at 6400 rpm for 10 min. The resulting dye dispersion was heated on a hot plate at 40° C. for 2 hours to evaporate the $CH_2Cl_2$.

A pellet of the liquid crystal TL216 (100 parts) and the acrylate mixture PN393 (20 parts) was prepared using a procedure analogous to that of Example I. The pellet was worked up by adding the dye dispersion to 1.5 g of pellet and mixing it thoroughly. The emulsion was coated onto an ITO-coated polyester substrate. The coating was allowed to dry in air for an hour before laminating with the ITO-coated polyester counter plate at 55° C. These cells were heated at 100° C. for 58 hr. The electro-optic properties of these cells are given in Table 5.

TABLE 5

| Thickness (μm) | $T_{off}$ (%) | $T_{on}$ (%) | VHR (%) | $E_{90}$ (V/μm) | Hysteresis (%) | Rise Time (msec) | Fall Time (msec) |
|---|---|---|---|---|---|---|---|
| 8.0 | 14.7 | 58.9 | 91 | 1.0 | 11 | 20 | 89 |
| 8.0 | 14.3 | 58.3 | 89 | 1.0 | 12 | 22 | 86 |

EXAMPLE V

MGGl dye was dissolved in the $CH_2Cl_2$ to obtain a 2.5% solution. A solution of 5.0 g of dye and $CH_2Cl_2$ was mixed with 8 g of a solution containing 1.0% Aerosol OT, a low molecular weight dispersant available from American Cyanamid, in water. This was emulsified at 6400-7000 rpm for 3 min, giving an emulsion with a mean volume diameter of 0.98 μm. This dye dispersion was heated on a hot plate at 50° C. for 4 hr to evaporate the $CH_2Cl_2$. This was allowed to sediment for approximately 3 days and the majority of the solution was pipetted off. The dye which had settled was redispersed with approximately 2 g of water; this dye dispersion was used for subsequent sample preparation. The dye concentration was measured as 1.3% by weight and the surfactant level was estimated as 0.3%.

A pellet was prepared as follows: 27.648 g of TL205 liquid crystal was mixed with 5.526 g of an acrylate blend designated as AF-18 (89% 2-ethylhexyl acrylate (Aldrich Chemicals), 10% Photomer™ 5018 (Henkel), and 1% Darocur™ 4265 (Ciba-Geigy)) in a 100 mL beaker until the solution appeared clear and homogenous, after which 36.892 g of 10% Vinol™ 205 PVA solution was added. This was mixed at about 3900 rpm for 3.5 min to give an emulsion with a mean volume diameter of 1.67 μm. This emulsion was allowed to settle (degas) overnight in a refrigerator, after which it was split into portions of 8-9 g each in 50 mL beakers with a 1 inch (2.54 cm) stirbar in each. These were packed in ice for about one hour; following this, each was cured under a UV light source at about 11 mW/cm² for 15 min, under nitrogen at 0° to 1° C., with stirring. The batches were recombined for subsequent centrifugation; a portion of the cured emulsion was mixed with a 1% Vinol™ 205 PVA solution and centrifuged at 15,000 rpm for sixty min. The supernatant solution was decanted off, leaving a pellet of centrifuged reactive additive emulsion. Measured solids in the pellet were 87.57%, giving a composition for the pellet of 86.57% liquid crystal/acrylate (ratio of TL205:AF18 being 83.4:16.6), 0.13% PVA, and 13.3% water.

An emulsion was worked-up by adding 0.780 g dye dispersion to 0.707 g of pellet, 0.176 g 40% Neorez™ 967 polyurethane and 0.060 g 10% poly(vinyl pyrrolidone) (Povidone USP (PVP, from GAF); this was mixed thoroughly. The emulsion was filtered and coated onto an ITO-coated polyester substrate. The coating was allowed to dry in air for an hour before laminating with the ITO-coated polyester counter plate. These cells were heated at 80° C. for 16 hr. The electro-optic properties of such a cell are given in Table 6.

TABLE 6

| Thickness (µm) | $T_{off}$ (%) | $T_{on}$ (%) | VHR (%) | $E_{90}$ (V/µm) | Hysteresis (%) | Rise Time (msec) | Fall Time (msec) |
| --- | --- | --- | --- | --- | --- | --- | --- |
| 6.1 | 30.5 | 68.7 | 86.0 | 1.1 | 15.4 | 35 | 152 |

EXAMPLE V

An alumina jar and 0.25 inch alumina balls were charged with 0.30 g MGG1 dye and 30 mL of an aqueous 2.0% Vinol™ 205 PVA solution. This was milled at 60 rpm for 17 hr, after which the solution was decanted off, giving a dye dispersion with a mean volume diameter of 1.32 µm. The resulting dye dispersion was used for subsequent sample preparation.

A pellet was prepared as follows: 27.648 g of TL-205 liquid crystal was mixed with 5.526 g of the AF-18 acrylate blend in a 100 mL beaker until the solution appeared clear and homogeneous, after which 36.892 g of 10% Vinol™ 205 PVA solution was added. This was mixed at about 3900 rpm for 3.5 min to give an emulsion with a mean volume diameter of 1.67 µm. This emulsion was allowed to settle (degas) overnight in a refrigerator, after which it was split into portions of 8–9 g each in 50 mL beakers with a 1 inch (2.54 cm) stirbar in each. These were packed in ice for approximately one hour; following this, each was cured under a UV light source at about 11 mW/cm$^2$ for 15 min, under $N_2$, at 0° to 1° C., with stirring. The batches were recombined for subsequent centrifugation; a portion of the cured emulsion was mixed with .1% w/w aqueous PVA (Vinol™ 205 from Air Products) solution and centrifuged at 15,000 rpm for 60 min. The supernatant solution was decanted off, leaving a pellet of centrifuged reactive additive emulsion; measured solids in the pellet was 87.57%, giving a composition for the pellet of 86.57% liquid crystal/acrylate (ratio of TL205:AF18 being 83.4:16.6), 0.13% PVA and 13.3% water.

An emulsion was worked-up by adding 1.045 g dye dispersion to 0.827 g of pellet, 0.076 g 40% Neorez™ 967 polyurethane, 0.056 g 20% Vinol™ 205 PVA solution and 0.050 g water; this was mixed thoroughly. The emulsion was filtered and coated onto an ITO-coated polyester substrate. The coating was allowed to dry in air for an hour before laminating with the ITO-coated polyester counter plate. Such cells were heated at 80° C. for 20 hr. The electro-optic properties of representative cells are given in Table 7.

TABLE 7

| Thickness (µm) | $T_{off}$ (%) | $T_{on}$ (%) | VHR (%) | $E_{90}$ (V/µm) | Hysteresis (%) | Rise Time (msec) | Fall Time (msec) |
| --- | --- | --- | --- | --- | --- | --- | --- |
| 6.4 | 28.0 | 68.1 | 94.6 | 0.93 | 18.4 | 40 | 213 |
| 6.6 | 28.1 | 68.2 | 95.4 | 0.88 | 19.0 | 41 | 227 |

EXAMPLE VI 0.8 g of MGG1 dye and 0.4 g of poly(n-hexyl acrylate) was dissolved in 20 g $CH_2Cl_2$. 20 g of 1% PVA (Vinol 540) was re-circulated through a Microfluidizer M110S dispersion unit (Microfluidics International Corp.) at 100 psi while 1.0 g $CH_2Cl_2$ was added. The dye/polymer/solvent solution was then added dropwise to the re-circulating PVA/$CH_2Cl_2$ solution; the Microfluidizer was run for 10 min. beyond the last addition. The resulting dye dispersion was stirred for 16 hr at approximately 30° C. to evaporate $CH_2Cl_2$. A portion of this solution was diluted to a 3% dye level (assuming the original volatilized dye dispersion was at 4% dye).

The present invention provides for, among other things, the introduction of a dye into droplets of liquid crystal material after an interfacial material is cured. Thus, the dye does not interfere with the curing or polymerization of the interfacial material. A dye dispersion is used as a carrier for introduction of the dye into the volumes, droplets or capsules of the liquid crystal material which may be successively surrounded by the interfacial material, the encapsulating material, and the matrix material. The resultant composite provides a device with good contrast ratios and low operating voltages.

Liquid crystal displays used for displaying high information content and motion such as videos often contain "active matrix panels" as electronic drivers for providing the voltage signal to the liquid crystal composite. For displays operated via active matrix drive, it is desirable to have liquid crystal composites that have good contrast as well as high brightness at low drive voltages, and which also are highly resistive in order to maintain the voltage supplied by the active matrix panel. The present invention provides a means of obtaining good contrast, high brightness, low voltage, high resistivity liquid crystal composites for use with active matrix drive panels.

One of the substrates 15a or 15b can be a substrate which provides different electrical signals to different portions (picture elements or pels) of the display. This substrate, which is sometimes referred to as the driver, provides the ability to display patterns by having portions of the liquid crystal composite of the display at various levels of transmission. The driver can be a patterned electrode, or it can be an "active matrix panel". An active matrix panel has an active electronic element, e.g. a transistor, at each picture element. The active matrix panel can be either transmissive, e.g. a thin film transistor array (TFT) on glass, or non-transmissive, e.g., a CMOS wafer.

The foregoing detailed description of the invention includes passages which are chiefly or exclusively concerned with particular parts or aspects of the invention. It is to be understood that this is for clarity and convenience, that a particular feature may be relevant in more than just a passage in which it is disclosed, and that the disclosure herein includes all the appropriate combinations of information found in the different passages. Similarly, although the various figures and descriptions thereof relate to specific embodiments of the invention, it is to be understood that where a specific feature is disclosed in the context of a particular figure, such feature can also be used, to the extent appropriate, in the context of another figure, in combination with another feature, or in the invention in general.

What is claimed is:

1. A method of making a liquid crystal composite comprising plural volumes of a liquid crystal material and a component dispersed in a containment medium, comprising the steps of:
   (a) forming volumes in which a liquid crystal material is bounded by said containment medium;
   (b) forming a dispersion of a component, separate from the volumes of the liquid crystal material;
   (c) combining and forming an emulsion comprising the dispersion of the component and the volumes of liquid crystal material; and
   (d) causing the component to transfer from the dispersion into the volumes of the liquid crystal material.

2. A method according to claim 1, wherein the component is selected from a group consisting of additives, interface modifiers and twist agents.

3. A method according to claim 1, wherein the component is a dye.

4. A method according to claim 1, wherein the containment medium includes an interfacial material selected from the group consisting of acrylates, methacrylates, epoxies, polyureas, siloxanes, and mixtures thereof.

5. A method according to claim 1, wherein the volumes are formed by an emulsification process.

6. A method according to claim 1, wherein the component is a pleochroic dye and the dispersion of step (b) is formed by combining the pleochroic dye and a dispersing agent to form a dye dispersion.

7. A method according to claim 6, wherein the dispersing agent is a low molecular weight dispersant.

8. A method according to claim 7, wherein step (b) includes dispersing a dye powder in the dispersing agent.

9. A method according to claim 7, wherein step (b) includes dissolving the dye in a volatile solvent to form a solution thereof, emulsifying the combination of the solution and the dispersing agent, and removing the solvent to form the dye dispersion.

10. A method according to claim 6, wherein the dispersing agent is a macromolecular binder material in an aqueous carrier medium.

11. A method according to claim 8, wherein the dispersing agent is poly(vinyl alcohol) or polyurethane.

12. A method according to claim 6, wherein the particle size of the dye in the dye dispersion is controlled to between about 0.1 and 3 µm in diameter by (i) centrifugation, (ii) varying the concentration of the dye in the solvent, or (iii) varying the temperature at which the solution of step (b) is formed.

13. A method according to claim 1, wherein a stabilizer is added to the dispersion of step (b).

14. A method for making a liquid crystal composite wherein plural volumes of a liquid crystal material and a dye are dispersed in a matrix material, and the liquid crystal material and dye are at least partially separated from the matrix material by an interfacial material and encapsulating material successively disposed around the liquid crystal material, which method comprises the steps of:

(a) forming an emulsion comprising the encapsulating material, the interfacial material or a precursor thereof, the liquid crystal material, and an aqueous carrier medium, under conditions such that (i) plural volumes of the liquid crystal material are contained by the encapsulating material and (ii) the interfacial material or a precursor thereof forms a homogeneous solution with the liquid crystal material;

(b) polymerizing the precursor of the interfacial material to form the interfacial material, where such precursor is present;

(c) removing the aqueous carrier medium to form capsules in which the liquid crystal material is successively surrounded by the interfacial material and encapsulating material;

(d) forming a dye dispersion, separate from the capsules;

(e) combining and forming an emulsion comprising the dye dispersion and the capsules;

(f) drying the emulsion; and (g) causing the dye to migrate into the liquid crystal material in the capsules.

15. The method of claim 14 wherein the dye dispersion is formed by:

dissolving the dye in a volatile solvent to form a solution thereof;

forming an emulsion comprising the solution and a dispersing agent; and removing the solvent from the emulsion comprising the solution and the dispersing agent to form the dye dispersion.

16. The method of claim 14 wherein the dispersing agent is the same material as the encapsulating material.

17. The method of claim 14 wherein the dye dispersion is formed by dispersing a dye powder in a dispersing agent.

18. The method of claim 14, wherein the interfacial material is selected from the group consisting of acrylates, methacrylates, epoxies, polyurethanes, polyureas, siloxanes, vinyl polymers, and mixtures thereof.

19. The method of claim 14, wherein the encapsulating material is selected from the group consisting of poly(vinyl alcohol), poly(vinyl pyrrolidone), poly(ethylene glycol), poly(acrylic acid) and its copolymers, poly(hydroxy acrylate), cellulose derivatives, epoxies, silicones, acrylates, polyesters, styrene-acrylic and acid-acrylate terpolymers, and mixtures thereof.

20. The method of claim 14, wherein the matrix material is selected from the group consisting of polyurethanes, poly(vinyl alcohol), poly(vinyl pyrrolidone), poly(ethylene glycol), poly(acrylic acid) and its copolymers, poly(hydroxy acrylate), cellulose derivatives, epoxies, silicones, acrylates, polyesters, styrene-acrylic acid-acrylate terpolymers, and mixtures thereof.

21. The method of claim 14, wherein step (g) comprises annealing the emulsion of step (e) at a temperature of between about 40° and 100° C. for between about 2 and 100 hours.

22. The method of claim 14, wherein step (g) comprises autoclaving the emulsion at temperatures of between about 30° and 100° C. and at pressures between about 40 and 150 pounds per square inch.

23. The method of claim 14, wherein a stabilizer is added to the dye dispersion of step (d).

* * * * *